United States Patent [19]

Jacobson

[11] Patent Number: 4,867,889
[45] Date of Patent: Sep. 19, 1989

[54] COMPOSITE BEARINGS HAVING IMPROVED WEAR LIFE

[75] Inventor: Charles Jacobson, Yardly, Pa.

[73] Assignee: Garlock Bearings, Inc., Thorofare, N.J.

[21] Appl. No.: 183,007

[22] Filed: Apr. 18, 1988

[51] Int. Cl.⁴ .................. C10M 125/02; F16C 33/02
[52] U.S. Cl. .......................... 252/12.6; 252/12.2; 252/12.4
[58] Field of Search ............... 252/12.2, 12.4, 12.6

[56] References Cited

U.S. PATENT DOCUMENTS

| | | | |
|---|---|---|---|
| 2,953,418 | 9/1960 | Runton et al. | 308/238 |
| 3,110,530 | 11/1963 | Herman | 308/238 |
| 3,131,979 | 5/1964 | Shobert | 308/238 |
| 3,328,100 | 6/1967 | Spokes | 308/238 |
| 3,741,855 | 6/1973 | Harrison et al. | 161/91 |
| 3,781,205 | 12/1973 | Cairns et al. | 252/12.6 |
| 3,864,197 | 2/1975 | Shobert | 161/96 |
| 3,870,589 | 3/1975 | Shobert | 161/47 |
| 3,870,589 | 3/1975 | Shobert | 161/47 |
| 4,107,381 | 8/1978 | Butzow et al. | 428/365 |
| 4,258,960 | 3/1981 | Harris | 156/175 |
| 4,732,818 | 3/1988 | Pratt et al. | 252/12.2 |

OTHER PUBLICATIONS

Garlock Bearings, Inc. trade literature for GAR-FIL® and GAR-MAX®, bulletin 821-C, copyrighted 1982.

*Primary Examiner*—Jacqueline V. Howard
*Attorney, Agent, or Firm*—Woodcock Washburn Kurtz Mackiewicz & Norris

[57] ABSTRACT

Self-lubricating bearings and methods for manufacturing these bearings are provided in which a lining comprising PTFE and a polymer bondable fiber are disposed within a polymeric material comprising at least about 5.0 weight percent carbon powder. In wear tests, graphite additions in the epoxy resin of the liner of the preferred bearings have resulted in wear depth reductions of 60% or better, with a lower coefficient of static friction during the early periods of wear. Additionally, lining epoxy compositions comprising up to about 20.0 weight percent graphite provided sufficient fluidity for current winding equipment to operate, whereas concentrations greater than 20.0 weight percent graphite were harder to manage due to excessive viscosity.

25 Claims, 3 Drawing Sheets

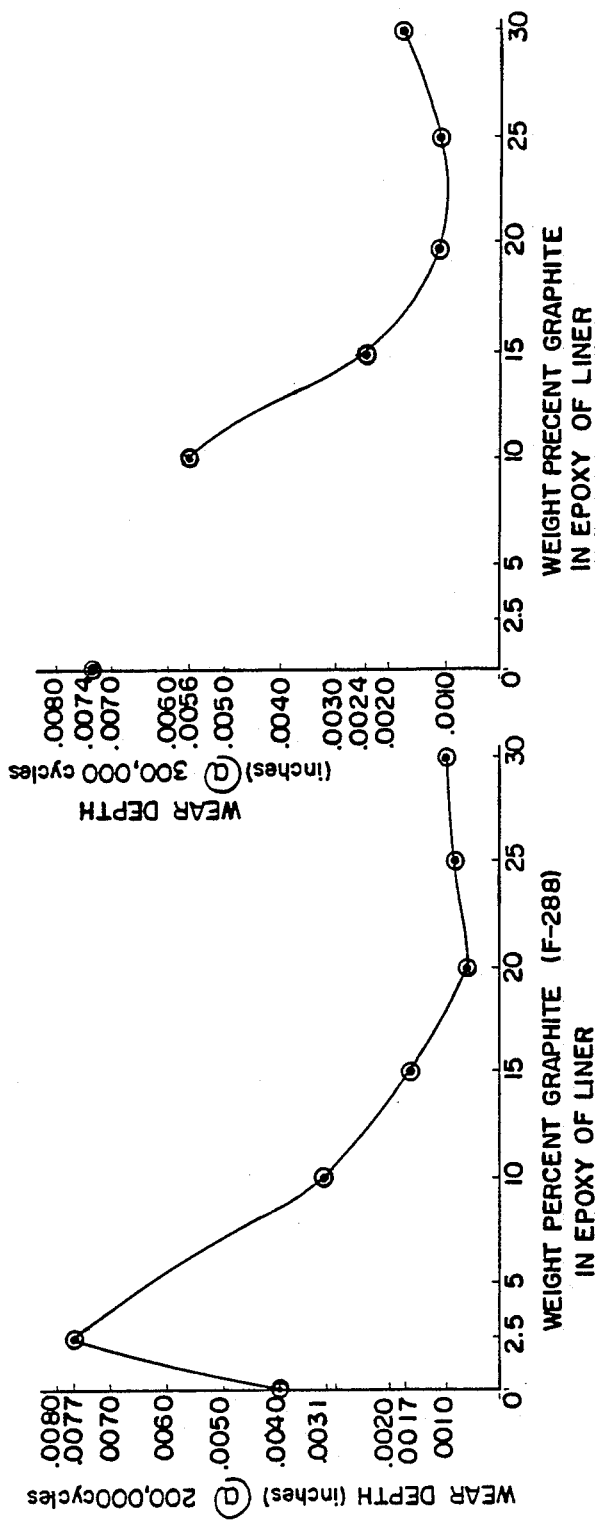

COMPOSITE BEARINGS HAVING IMPROVED WEAR LIFE

FIELD OF THE INVENTION

This invention relates to improvements in self-lubricating, composite bearings, and particularly to lowering the coefficient of friction for such bearings and to improve their wear life.

BACKGROUND OF THE INVENTION

Self-lubricating bearings used to provide low wear rates in a variety of high load applications must be resistant to damage, both during assembly and in service. They must tolerate dirty environments since some foreign material can often imbed in the liners of such bearings during service. They must also be resistant to a wide range of corrosive and non-corrosive fluids, including mild acids, alcohols, hydraulic oils, water, lubricating oils, detergents, and other materials. In many applications, these bearings must undergo impact and shock loads.

Bearings are currently available which feature a combination of a fibrous surface liner comprising a controlled filament wound pattern of both polytetrafluoroethylene (PTFE) and high strength fibers disposed within a thermosetting resin or other polymer. For example, it has been known to provide a thermo-setting resin bearing with a lining containing PTFE strands and other polymeric fabrics, which together adhere to the resin and provide a low coefficient of friction for minimizing wear. Reference is herein made to U.S. Pat. Nos. 2,953,418, to L. A. Runton et al.; 3,110,530, to F. Herman; and 3,130,979 to S. M. Shobert, which are hereby incorporated by reference.

It is generally known that PTFE, as it is customarily disposed on self-lubricating bearing surfaces, deteriorates as the temperature and fiber stresses increase during service. One attempt to overcome this deficiency has been to supplement the polytetrafluoroethylene fibers with graphite fibers and other materials to improve high temperature wear. Reference is herein made to U.S. Pat. No. 3,781,205, by J. Cairns et al. which is hereby incorporated by reference. Graphite fibers have been known to produce improved wear results, however this benefit is derived at the expense of high material costs which may range as high as $35.00 per pound.

Some have suggested that less expensive graphite powder and other solid lubricants in amounts up to 30 weight percent in the liner resin of composite bearings can provide beneficial wear results. See Cairns et al. However the usefulness of graphite powder in filament wound bearing liners has, up to now, not been proven.

Accordingly, a need exists for a self-lubricating bearing exhibiting longer wear life and improved heat dissipation. There is also a need for a low cost bearing exhibiting a lower coefficient of friction which can be manufactured using conventional winding equipment or an equivalent process.

OBJECTS OF THE INVENTION

It is, therefore, an object of this invention to provide a self-lubricating filament wound composite bearing exhibiting a longer wear life.

It is another object of this invention to provide a relatively inexpensive self-lubricating bearing that permits the dissipation of heat from the wear zone.

It is still another object of this invention to provide a method for manufacturing self-lubricating bearings having longer wear life.

With these objects in view, this invention resides in the novel construction, combination, arrangement of parts and methods substantially as hereinafter described and more particularly defined by the attached claims.

SUMMARY OF THE INVENTION

In accordance with the teachings of this invention, improved bearings and methods for manufacturing self-lubricating bearings are provided. The bearings comprise at least 5.0 weight percent powdered carbon material in combination with fibers of polytetrafluoroethylene (PTFE) and a second, bondable fiber in a polymeric matrix. The bearings are inexpensive to produce, conduct heat away from the "wear zone" and provide a lubrication transfer film for minimizing wear. Hilos long-term (500,000 cycles) tests of prototype bearings containing about 15.0 weight percent graphite in the epoxy liner exhibited less than 20% of the wear obtained using control bearings without graphite. Additionally, these experiments have indicated that graphite concentrations of less than 5.0 weight percent did not significantly reduce bearing wear. The range of 5.0 to about 25.0 weight percent carbon powder, preferably graphite, in combination with PTFE fibers bonded to the lining resin with a carrier yarn is believed to cause a "synergistic" effect on the wear life of self-lubricating bearings. Wear test data of bearings containing about 15.0 weight percent graphite in their resin but without PTFE fiber in the lining, have resulted in immediate catastrophic wear, indicating that graphite alone does not produce the above-indicated "unexpected" results.

Accordingly, this phenomena has been translated into improved wear data. At the 500,000 cycle test duration, bearings made with 15.0 weight percent graphite additions in the lining resin had 0.001 inch and 0.006 inch wear depths while "control" bearings, without graphite had 0.020 inch wear depth. Wear test data has repeatedly shown increased wear life as the weight percentage of graphite increases from 10.0 to 25.0 weight percent in the resin, and that no wear life improvement was observed when the graphite concentration was less than about 5.0 weight percent.

Additionally, the coefficient of static friction "$\mu s$" at 300,000 cycles showed a decrease from about 0.025 for the control bearing to about 0.020 with an addition of 15 weight percent graphite. The coefficient of static friction is believed to be related to the overall energy efficiency of a mechanism employing such bearings. Since more energy is required to overcome the static friction between the bearing and shaft, a lower coefficient of static friction could translate into lower power consumption.

At the higher end of the spectrum, for example, from 20.0 to 30.0 weight percent graphite, experiments reveal a general trend of increased viscosity in the epoxy-graphite suspension during winding of the bearing materials. It has been noted that 20 weight percent graphite filled epoxy resins have only marginal use in the filament winding operation. At this graphite composition, the epoxy mixture is very much like molasses, and the preferred liner cord material may not be thoroughly wetted because of the high viscosity. Compositions including 25 weight percent graphite were even more viscous, being similar to toothpaste in viscosity. Accordingly, the desirable range for the winding operation appears to be less than 20 weight percent graphite in these epoxy mixtures.

The improved wear results are believed to be due in part to the addition of graphite particles, preferably natural flake graphite, in amounts greater than 5.0 weight percent within the resin of the PTFE-containing lining. The graphite particles are understood to be ground into smaller dimensions as wear commences, to better fill the apertures of a steel shaft. While not being bound to any particular theory, it is believed that the preferred combination of polyester or nylon and PTFE fiber filaments act like a "broom" to collect exposed graphite particles. However, it is not until the fiber filaments are saturated with graphite, i.e. over 5.0 weight percent graphite, that excess graphite particles are available to transfer to the shaft or remain in the wear zone as a solid lubricant film in dynamic equilibrium.

Graphite is known to be a good heat conductor, and to resist oxidation at elevated temperatures of about 500° F. It is believed that these properties further contribute to bearing wear life because they effectively dissipate heat from the wear zone thereby preserving the integrity of the frictionally heated surfaces.

While it is expected that the addition of graphite fibers and/or weaves could produce a favorable decrease in friction, such additions would be cost-probative for most industrial applications. The bearings of this invention, on the other hand, incorporate relatively inexpensive graphite powder to the lining resin during production.

Accordingly, a cost effective and longer lasting, self-lubricating polymer bearing is disclosed that is resistant to damage, both during assembly and in service. The bearings produced by the preferred methods of this invention generally possess a lower static coefficient of friction, especially in the break-in and early periods of use. Additionally, test data for epoxy-graphite dispersions indicate that at least about a 100% decrease in centipoise viscosity can be produced when the graphite concentration is reduced from 30 to 15 weight percent.

BRIEF DESCRIPTION OF THE DRAWINGS

The accompanying drawings illustrate a complete embodiment of the invention according to the best mode so far devised for the practical application of the principles thereof, and in which:

FIG. 3 is a graphical depiction of Hilos wear depth test data at 200,000 cycles for GAR-MAX ® bearings tested at 15,000 p.s.i. having varying graphite concentrations; and FIG. 4 is a graphical depiction of Hilos wear depth test data at 300,000 cycles for the bearings tested in FIG. 3.

DETAILED DESCRIPTION OF THE INVENTION

Figure 1:
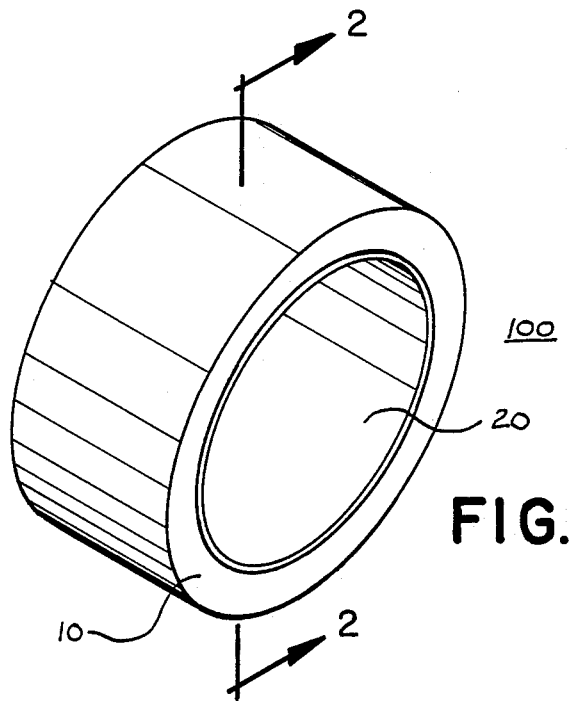
FIG. 1 is a perspective illustration of a preferred self-lubricating bearing of this invention.
Figure 2:
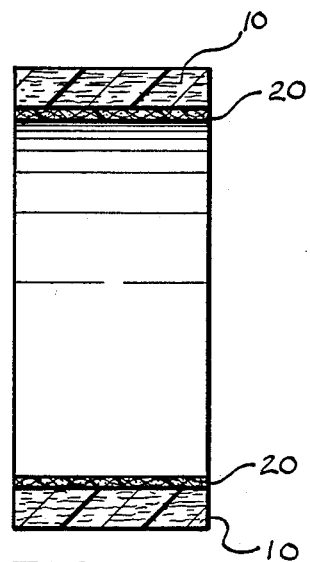
FIG. 2 is an enlarged detail of a side, cross-sectional view of the bearing of FIG. 1 taken through line 2—2.
Figure 5:
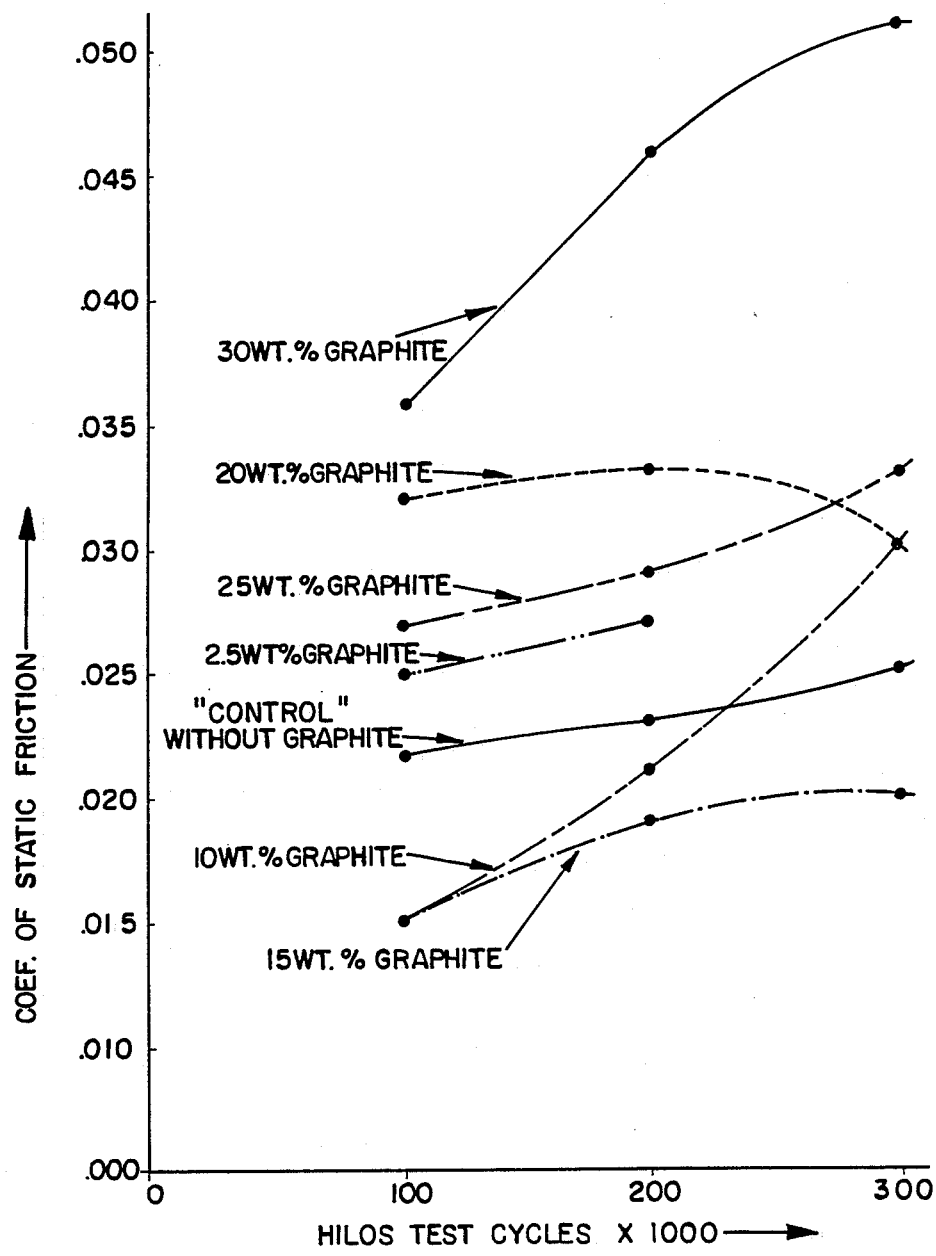
FIG. 5 is a graphical depiction of the coefficient of static friction ($\mu$s) between these bearings and a steel shaft during the test conditions of FIGS. 3 & 4.

The bearings of this invention comprise at least about 5.0 weight percent powdered carbon material in a polymeric matrix containing PTFE fibers wound with a second fibrous material which is bondable to the polymeric matrix. They out-perform other state-of-the-art filament wound composite bearings not including graphite in the specified ranges. This invention also demonstrates that the addition of graphite or carbon to the liquid epoxy recipe can reduce the winding tension, due to graphite's increased lubrication in the fluid state. This increased lubrication can also reduce yarn fuzzing, breakage and winding stresses. It has been noted that finished bearings using the indicated procedures have less surface scale defects because of reduced air entrainment in the epoxy recipe and because the stressed yarn is more readily relaxed in the lubricated epoxy mixture. Bearings containing the prescribed amounts of PTFE and graphite as synergistic self-lubricating agents in the composite's wear layer should enable consumers to use rougher surfaced shafts. This improvement will permit more economical assemblies and expand the commercial applications for such products.

Referring now to the Figures, a self-lubricating, composite bearing having improved wear-resistance is illustrated. The bearing 100 comprises a polymeric shell 10 having a surface thereon. Disposed on this surface, is a lubricating lining 20 comprising fibers of polytetrafluoroethylene wound with a second fibrous material. These fibers are disposed in a polymeric matrix comprising at least about 5.0 weight percent powdered carbon material.

The second fibrous material of this invention is bondable to the polymeric matrix of the lining 20. This second fibrous material preferably comprises a polymeric fiber which ca be twisted together with the polytetrafluoroethylene fibers. This twisted polymeric fiber can comprise resin-bondable yarn and may contain one or more of: polyester, nylon, aramid, and cellulosic material. The preferred yarns, however, are DACRON ® polyester or NOMEX ® nylon, because of their cost, uniformity and strength. The twisted fibers of this invention are ideally disposed within a resinous material, preferably a thermosetting polymer, and more preferably an epoxy.

The polymeric shell 10 and polymeric matrix of the lining 20 of this invention generally can comprise a resinous material, preferably any of the well-known thermosetting resins typically employed for such purposes. This material can include an epoxy resin, i.e., a polyether resin formed originally by the polymerization of bisphenol A and epichlorohydrin, having high strength, and low shrinkage during curing. Further examples of suitable materials for use in this connection are glass/epoxy, glass/polyester, glass/phenolic, linen/phenolic and cotton/phenolic. Other filaments, fabrics and suitable resin impregnates for providing the shell 10 and/or the lining matrix will readily occur to those skilled in the art.

One preferred epoxy resin of this invention includes about 1500 parts by weight EPON ® 826 or 828, by Shell Chemical Co. 1350 parts by weight hardener preferably comprising methyl anhydride, by Anhydrides & Chemical Co., or NADIC ® methyl anhydride, by Buffalo Color Corp., and 30 parts by weight of a curing accelerator preferably comprising "BDMA" benzyl dimethyl amine, accelerator DY062, by Ciba-Geigy Corp. Two acceptable categories of epoxy formulations which are based upon their hardener reactive ingredients include those reacted with various anhydrides or amines. It is anticipated, however, that the graphite additions described herein would have a lubricating effect regardless of which type of hardener reactant was used.

According to an important teaching of this invention, the lining 20 preferably comprises about 5.0 to 25.0 weight percent carbon powder or graphite, more preferably the polymeric matrix of the lining comprises 7.5 to about 20.0% by weight percent graphite, and most preferably about 10.0 to 17.5% by weight graphite. These selected compositional ranges provide the optimum characteristics of a relatively low coefficient of static friction, low viscosity in their liquid state, and extended wear life. It is expected that both natural and synthetic graphite preferably of standard commercial particle size or finer may be employed, however, natural mined flakes of graphite are particularly desirable because they produce more lubricity when sheared under bearing stresses. Suitable examples of commercially available graphite are A-625 synthetic graphite and F-288 natural flake graphite from Asbury Graphite Mills, Asbury, N.J. It is preferred that the particle sizes for graphite powders used in this invention should be about 93% through 325 mesh, or less in size. Ideally, these particles should be pre-mixed into one of the epoxy recipe ingredients to remove clusters. Ball mills, roller mills, and high shear mixers are well known equipment in the solids dispersion industry to accomplish this task.

Dispersing aids can also be added to the epoxy mixes to better suspend the solid graphite particles in the liquid epoxy and to minimize settling by agglomeration. A preferred combination is about 15.0 weight percent F-288 natural flake graphite (Asbury Graphite Mills, Asbury, N.J.) into one of the above-described epoxy recipes with a 0.4 to 1.0 wt. % dispersing aid (Example: Troy Sol CD-2 Troy Chemical Corporation, Newark, N.J.).

The pre-mixed graphite solids generally remain uniformly suspended in the total epoxy mixture by a simple 10 minute mixing with an industrial "Jiffy" or "Lightning Propeller Mixer". The resulting graphite-epoxy dispersion is used to wind the preferred helical weave of PTFE and resin-bondable yarn of the liner wind. Small amounts of graphite, i.e. less than 5.0%, can also be added to the epoxy resin shell composition to serve as a pigment, and processing aid for filament windings, i.e. lowering winding tension, etc. It is known that graphite additions in the shell exceeding 5.0 weight percent can be counter-productive because excessive amounts of graphite will weaken the compressive strength of the shell.

According to the procedures of this invention, two-plies of polyester (DACRON®) or nylon (NOMEX®) and one-ply of PTFE fiber are twisted together and helically wound over a chrome plated steel mandrel to an average wall thickness of about 0.01 to 1.0, preferably about 0.025 to 0.035 inches. This helically wound cord is previously dipped into an epoxy resin having the preferred compositions discussed herein, to saturate the fibers. Alternatively, the bearings of this invention could be manufactured using such methods as pulling a knitted tube of fibers or wrapping a woven cloth of fibers over a mandrel prior to, or subsequent to, impregnation with epoxy-carbon powder recipes.

After the liner 20 has partially cured, i.e., obtained a "B" stage, 8-10 plies of untwisted fiberglass can be saturated in the epoxy resin and helically wound over the liner wind material layer to the thickness required of the specified bearing outer diameter.

Certain of the benefits of this invention are exemplified by the following examples. Each example was tested on a Hilos bearing test machine, developed by Garlock Bearing, Inc. in 1976 to test self-lubricating bearing wear life at conditions of high load, typically greater than 10,000 p.s.i. and low speed, typically from about 0.88 to about 1.3 feet/minute. The +/−30° oscillating mode of shaft direction simulates many of the commercial applications for the bearing products this machine tests, for example, the pivot mechanism of a bucket hoe on earth grading and loading machines. The high load is applied to the fixed bearing, encased in a housing, through a weight loaded mechanical cantilever system. The shaft, supported on both sides beyond the test bearing, oscillates by a variable speed motor drive though the test bearing which is maintained at a constant load. Wear depth is measured as the test progresses by measuring the depth from a fixed point above the bearing.

EXAMPLE I

A PTFE-Dacron® filament wound composite bearing (1620-16 GARMIX by Garlock Bearing, Thorofare, N.J.) without graphite was tested on a Hilos testing machine with the following test conditions: pressure=10,000 PSI, oscillation=60° total +/−30° from center, speed=10 cycles per minute and a steel shaft finish=7 micro-inches AA and surface hardness of about 58 to 63 Rockwell "C". This test represented the "control" and was conducted over approximately a two-month period, resulting in a wear depth of 0.021 inches at 500,000 cycles.

EXAMPLE II

A bearing having the lining composition and construction of example I, but including 5.0 weight percent synthetic graphite (A-625) in the epoxy liner was subject to the same Hilos test conditions. After 500,000 cycles, the wear depth of this bearing was 0.023 inches. This result indicates no significant improvement in wear depth with a 5% graphite addition compared to the control bearing of Example I. It is believed that less than 5% graphite concentrations are therefore not helpful. Additionally, the "chunky shape" of synthetic graphite may not be as lubricating as natural flake particle mined graphite.

EXAMPLE III

A bearing having the same construction and composition as Example I, but including 15.0 weight percent natural graphite (F-288) in the epoxy liner, was tested with the same Hilos test conditions. The test was terminated after 260,000 cycles, however, the wear-depth was 0.0022 inches, which represented a significant improvement over the control wear life which revealed wear depths of 0.010 inches at 200,000 cycles and 0.014 inches at 300,000 cycles.

EXAMPLE IV

A bearing having the same construction and composition as Example I, but including 15.0 weight percent natural flake graphite (F-288) in the epoxy liner was tested with the same Hilos test conditions. This bearing had a wear depth of 0.0034 at 500,000 cycles. The wear depth of this bearing at the 500,000 cycle mark was 85% less than the wear depth for the control, Example I.

EXAMPLE V

A bearing having the same bearing and composition as Example I, but including 15.0 weight percent natural flake graphite (F-288) in the epoxy liner was tested with the same Hils test conditions, with the exception that the cycle speed was increased to 15 cycles/min. The test was terminated after 260,000 cycles and the wear results revealed a wear depth of 0.0008 inches. This result revealed a similar improvement in wear life as compared to Examples III and IV.

EXAMPLE VI

A bearing having the same construction and composition as Example I, but including 15.0 weigh percent natural flake graphite (F-288) and having no PTFE in its liner, was tested with the same Hilos conditions. The test was terminated at 1000 cycles due to catastrophic failure, indicating that the absence of PTFE within the lining is fatal to wear life and that graphite alone is not sufficient.

EXAMPLE VII

A PTFE-Dacron® filament wound composite bearing (1620-12 GARMAX by Garlock Bearing) was tested as a "control" under the following Hilos conditions: pressure=15,000 psi, oscillation=60° total +/-30 from center, speed=15 cycles per minute, and a shaft finish=7 micro-inches AA and surface hardness of about 58 to 63 Rockwell "C". After 300,000 cycles, the wear depth for this control bearing was 0.0074 inches. The test was terminated after 375,000 cycles when edge loading occurred.

EXAMPLE VIII

An addition of 2.5 weight percent graphite (F-288) was added to the epoxy liner of the control composition of Example VII. After 225,000 cycles, the test was terminated. This bearing had a wear depth at 200,000 cycles of 0.0077 inches which was 93% greater than that for the control of Example VII. This result indicates that the low levels of graphite act as an abrasive until a "threshold" higher concentration begins the lubricating effects.

EXAMPLE IX

The control composition and construction of Example VII was supplemented with 10.0 weight percent natural graphite (F-288) in the epoxy liner under the same Hilos test conditions. After 300,000 cycles, the wear depth for this bearing was 0.0056. This represented about 24% less wear than that obtained by the control, Example VII. The wear depth decrease of this bearing indicates that the threshold concentration had begun.

EXAMPLE X

The control composition of Example VII was supplemented with 15.0 weight percent graphite (F-288) in the epoxy liner. After 300,000 cycles, the wear depth for this bearing was 0.0024 inches. This difference represented a 67% decrease in wear depth versus the bearing of the control composition, Example VII.

EXAMPLE XI

The control composition of Example VII was supplemented with 20.0 weight percent graphite (F-288) in the epoxy liner. After 300,000 cycles the wear depth for this bearing was 0.0010 inches. This differences represented a 86% decrease in wear depth versus the bearing of the control composition, Example VII.

EXAMPLE XII

The control composition of Example VII was supplemented with 25.0 weight percent graphite (F288) in the epoxy liner. After 300,000 cycles the wear depth for this bearing was 0.0009 inches. This difference represented an 88% decrease in wear depth versus the bearing of the control composition, Example VII.

EXAMPLE XIII

The control composition of Example VII was supplemented with 30.0 weight percent graphite (F-288) in the epoxy liner. After 300,000 cycles, the wear depth for this bearing was 0.0018 inches. This difference represented a 76% decrease in wear depth versus the bearing of the control composition, Example VII.

These Hilos long-term wear tests have indicated that polytetrafluoroethylene-polyester wound liner layers containing less than 5.0 weight percent graphite in an epoxy resin show no significant improvement in wear life. In fact, these tests indicate that low graphite concentrations in the lining may not fully fill the interstices of the lining and shaft, and contrary to their intended purpose, may act as an abrasive to increase wear.

In further view of these examples, it is apparent that the addition of carbon or graphite powder into PTFE-filament wound composite bearings represents the compositional change responsible for the significant decrease in bearing wear. The comparative wear results of bearings comprising about 10.0 to about 17.5 weight percent graphite within the indicated epoxy recipes have demonstrated greatly improved wear over similarly constructed bearings without graphite and bearings having less than about 5.0 weight percent graphite. The following tables reflect general observations in viscosity and static coefficient of friction measurements when the graphite concentration is varied.

TABLE I

| EPOXY RECIPE VISCOSITY MEASUREMENTS USING A HAAKE VISCOSIMETER AT 77° F. | |
|---|---|
| Epoxy Resin Composition | Centipoise Equivalent |
| "Control" — no graphite added | 1,600 |
| "Control" + 5 wt. % F-288 graphite | 3,500 |
| "Control" + 10 wt. % F-288 graphite | 4,600 |
| "Control" + 15 wt. % F-288 graphite | 11,700 |
| "Control" + 20 wt. % F-288 graphite | 12,200 |
| "Control" + 25 wt. % F-288 graphite | 17,700 |
| "Control" + 30 wt. % F-288 graphite | 46,600 |

TABLE II

| COEFFICIENT OF STATIC FRICTION ($\mu s$) vs. HILOS WEAR TEST CYCLES AT VARIOUS GRAPHITE (F-288) CONCENTRATIONS | | | |
|---|---|---|---|
| % Graphite | 100,000 cycles | 200,000 cycles | 300,000 cycles |
| 0.0 (control) | .022 | .023 | .025 |
| 2.5 | .025 | .028 | — |
| 10.0 | .015 | .022 | .031 |
| 15.0 | .015 | .019 | .020 |
| 20.0 | .032 | .033 | .029 |

TABLE II-continued
COEFFICIENT OF STATIC FRICTION (μs)
vs. HILOS WEAR TEST CYCLES AT VARIOUS
GRAPHITE (F-288) CONCENTRATIONS

| % Graphite | 100,000 cycles | 200,000 cycles | 300,000 cycles |
|---|---|---|---|
| 25.0 | .027 | .029 | .033 |
| 30.0 | .036 | .046 | .051 |

In View of this data and other, more qualitative observations made during these experiments, it is concluded that using about 20 weight percent or more graphite in the resin used to wind the linings produces bearings that can exhibit increased static friction. Moreover, high graphite concentrations, i.e. more than 20%, present manufacturing difficulties in winder apparatus due to excessive viscosity caused by these higher graphite concentrations in the resin bath.

However, bearings comprising about 10.0 to about 17.5 weight percent graphite exhibit coefficients of about 30% lower than those of control bearings during the early periods of wear. The addition of up to about 20% graphite in the epoxy recipe, moreover, presents the associated manufacturing and application benefits such as lower winding tension, reduced yarn fuzzing, less breakage, and decreased winding stresses. Although various embodiments have been illustrated, this was for the purpose of describing, but not limiting the invention. Various modifications, which will become apparent to one skilled in the art, are within the scope of this invention described in the attached claims.

We claim:

1. A self-lubricating, composite bearing having improved wear-resistance, comprising:
   (a) a supporting shell having a surface; and
   b) a lubricating lining disposed on said surface comprising fibers of polytetrafluoroethylene wound with a second fibrous material said fibers being in a polymeric matrix comprising about 5 weight to about 25 wt. % percent powdered carbon, said second fibrous material being bondable to the polymeric matrix.

2. The bearing of claim 1 wherein said powdered carbon comprises graphite.

3. The bearing of claim 2 wherein said matrix comprises about 5 weight percent to about 25 weight percent graphite.

4. The bearing of claim 2 wherein said matrix comprises about 7.5 to about 20.0 weight percent graphite.

5. The bearing of claim 2 wherein said matrix comprises about 10 to about 17.5 weight percent graphite.

6. The bearing of claim 1 wherein said matrix comprises about 15 weight percent graphite.

7. The bearing of claim 3 wherein said graphite comprises natural flake graphite.

8. The bearing of claim 1 wherein said second fibrous material comprises a polymeric fiber twisted together with said polytetrafluoroethylene fibers.

9. The bearing of claim 8 wherein said polymeric fiber comprises a resin-bondable yarn.

10. The bearing of claim 8 wherein said polymeric fiber comprises at least one of: polyester, nylon, aramid and cellulosic fibers.

11. The bearing of claim 8 wherein said polymeric and polytetrafluoroethylene fibers are disposed within a resinous material.

12. The bearing claim 9 wherein said resinous material comprises a thermosetting polymer.

13. The bearing of claim 10 wherein said polymeric shell comprises a resinous material.

14. The bearing of claim 10 wherein said polymeric shell comprises a thermosetting polymer.

15. The bearing of claim 14 wherein said polymeric shell comprises graphite.

16. The bearing of claim 15 wherein said polymeric shell comprises fiberglass.

17. A self-lubricating, composite bearing having improved wear-resistance, comprising:
   (a) a shell comprising reinforced thermosetting resin having a surface thereon; and
   (b) a lining disposed on said surface of said polymeric shell, said lining comprising at least about 10.0 weight percent graphite and a plurality of helically wound fibers of each of polytetrafluoroethylene and either polyester or nylon in a thermosetting matrix.

18. In a method of manufacturing a self-lubricating, composite bearing having improved wear resistance, the improvement comprising: disposing a liner onto a mandrel, said liner comprising fibers of polytetrafluoroethylene and a resin-bondable material in a thermosetting resin matrix having about 5.0 weight percent carbonaceous powder, said liner comprising a woven or knitted material.

19. A method of manufacturing a self-lubricating composite bearing, comprising:
   (a) disposing a plurality of fibers comprising polytetrafluoroethylene and a resin-bondable material onto a mandrel means for rotating said fibers, said fibers being disposed in thermosetting resin comprising about 5.0 weight percent about 25 weight percent powdered carbon material,
   (b) curing said thermosetting resin to form a rigid composite; and
   (c) removing said composite from said mandrel means.

20. The method of claim 19 wherein said disposing step comprises disposing said plurality of fibers in a thermosetting resin comprising from about 7.5 weight percent to about 20.0 weight percent powdered carbon material.

21. The method of claim 19 wherein said disposing step comprises disposing said plurality of fibers in a thermosetting resin comprising from about 10.0 weight percent to about 17.5 weight percent powdered carbon material.

22. The method of claim 19 wherein said disposing step comprises providing a carbonaceous powder comprising graphite.

23. The method of claim 20 wherein said disposing step comprises providing said plurality of fibers in the form of a helical winding.

24. The method of claim 21 wherein said disposing step provides a thermosetting resin comprising epoxy.

25. The method of claim 22 wherein said disposing step further comprises drawing said helical winding through a bath of filled epoxy resin comprising at least 10 weight percent powdered carbon material.

* * * * *

UNITED STATES PATENT AND TRADEMARK OFFICE
CERTIFICATE OF CORRECTION

PATENT NO. : 4,867,889

DATED : September 19, 1989

INVENTOR(S) : Charles Jacobson

It is certified that error appears in the above-identified patent and that said Letters Patent is hereby corrected as shown below:

Col. 10, line 29, after "percent" insert therefore -- to about 25 weight percent --;
Col. 10, line 38, after "percent" insert therefore -- to --.

Signed and Sealed this

Twenty-sixth Day of March, 1991

Attest:

HARRY F. MANBECK, JR.

*Attesting Officer*  *Commissioner of Patents and Trademarks*